US010469588B2

(12) United States Patent
Gorshechnikov et al.

(10) Patent No.: US 10,469,588 B2
(45) Date of Patent: Nov. 5, 2019

(54) METHODS AND APPARATUS FOR ITERATIVE NONSPECIFIC DISTRIBUTED RUNTIME ARCHITECTURE AND ITS APPLICATION TO CLOUD INTELLIGENCE

(71) Applicant: Neurala, Inc., Boston, MA (US)

(72) Inventors: Anatoly Gorshechnikov, Newton, MA (US); Massimiliano Versace, South Boston, MA (US); Heather Ames Versace, South Boston, MA (US); Gennady Livitz, Belmont, MA (US)

(73) Assignee: Neurala, Inc., Boston, MA (US)

(*) Notice: Subject to any disclaimer, the term of this patent is extended or adjusted under 35 U.S.C. 154(b) by 951 days.

(21) Appl. No.: 14/947,337

(22) Filed: Nov. 20, 2015

(65) Prior Publication Data

US 2016/0198000 A1     Jul. 7, 2016

Related U.S. Application Data

(63) Continuation of application No. PCT/US2014/039162, filed on May 22, 2014.

(Continued)

(51) Int. Cl.
*H04L 29/08* (2006.01)
*G06F 9/50* (2006.01)
(Continued)

(52) U.S. Cl.
CPC .......... *H04L 67/125* (2013.01); *G06F 9/5066* (2013.01); *G06F 9/546* (2013.01);
(Continued)

(58) Field of Classification Search
None
See application file for complete search history.

(56) References Cited

U.S. PATENT DOCUMENTS

| 5,063,603 | A | 11/1991 | Burt |
| 5,136,687 | A | 8/1992 | Edelman et al. |

(Continued)

FOREIGN PATENT DOCUMENTS

| EP | 1 224 622 B1 | 7/2002 |
| WO | WO 2014/190208 | 11/2014 |

(Continued)

OTHER PUBLICATIONS

Al-Kaysi, A. M. et al., A Multichannel Deep Belief Network for the Classification of EEG Data, from Ontology-based Information Extraction for Residential Land Use Suitability: A Case Study of the City of Regina, Canada, DOI 10.1007/978-3-319-26561-2_5, 8 pages (Nov. 2015).

(Continued)

*Primary Examiner* — Angela Nguyen
(74) *Attorney, Agent, or Firm* — Smith Baluch LLP

(57) ABSTRACT

The system and methods disclosed herein include a runtime architecture that takes a nonspecific set of systems of differential equations, distributes them across the network, and iteratively integrates them through time with a possibility to output the results on every iteration. Embodiments of the disclosed system may be used for neural computation or any other suitable application. Embodiments can be used as a standalone engine or as part of another computational system for massively parallel numerical integration of a data-driven dynamical system.

32 Claims, 11 Drawing Sheets

Related U.S. Application Data

(60) Provisional application No. 61/826,380, filed on May 22, 2013.

(51) Int. Cl.
 *G06N 3/04* (2006.01)
 *H04L 12/26* (2006.01)
 *G06F 9/54* (2006.01)

(52) U.S. Cl.
 CPC ......... *G06N 3/0454* (2013.01); *H04L 43/045* (2013.01); *H04L 67/10* (2013.01)

(56) References Cited

U.S. PATENT DOCUMENTS

| | | | |
|---|---|---|---|
| 5,172,253 | A | 12/1992 | Lynne |
| 5,388,206 | A | 2/1995 | Poulton et al. |
| 6,018,696 | A | 1/2000 | Matsuoka et al. |
| 6,336,051 | B1 | 1/2002 | Pangels et al. |
| 6,647,508 | B2 | 11/2003 | Zalewski et al. |
| 7,765,029 | B2 | 7/2010 | Fleischer et al. |
| 7,861,060 | B1 | 12/2010 | Nickolls et al. |
| 7,873,650 | B1 * | 1/2011 | Chapman .......... G06F 17/30958 707/764 |
| 8,392,346 | B2 | 3/2013 | Ueda et al. |
| 8,510,244 | B2 | 8/2013 | Carson et al. |
| 8,583,286 | B2 | 11/2013 | Fleischer et al. |
| 8,648,828 | B2 | 2/2014 | Gorchetchnikov et al. |
| 9,031,692 | B2 | 5/2015 | Zhu |
| 9,177,246 | B2 | 11/2015 | Buibas et al. |
| 9,189,828 | B2 | 11/2015 | Gorchetchnikov et al. |
| 9,626,566 | B2 | 4/2017 | Versace et al. |
| 2002/0046271 | A1 | 4/2002 | Huang |
| 2002/0050518 | A1 | 5/2002 | Roustaei |
| 2002/0064314 | A1 | 5/2002 | Comaniciu et al. |
| 2002/0168100 | A1 | 11/2002 | Woodall |
| 2003/0026588 | A1 | 2/2003 | Elder et al. |
| 2003/0078754 | A1 | 4/2003 | Hamza |
| 2004/0015334 | A1 | 1/2004 | Ditlow et al. |
| 2005/0166042 | A1 | 7/2005 | Evans |
| 2006/0184273 | A1 | 8/2006 | Sawada et al. |
| 2007/0052713 | A1 | 3/2007 | Chung et al. |
| 2007/0198222 | A1 | 8/2007 | Schuster et al. |
| 2007/0279429 | A1 | 12/2007 | Ganzer |
| 2008/0033897 | A1 | 2/2008 | Lloyd |
| 2008/0066065 | A1 | 3/2008 | Kim et al. |
| 2008/0117720 | A1 | 5/2008 | Gorchetchnikov et al. |
| 2008/0258880 | A1 | 10/2008 | Smith et al. |
| 2009/0080695 | A1 | 3/2009 | Yang et al. |
| 2009/0089030 | A1 | 4/2009 | Sturrock et al. |
| 2009/0116688 | A1 | 5/2009 | Monacos et al. |
| 2010/0048242 | A1 * | 2/2010 | Rhoads ............. G06F 17/30244 455/556.1 |
| 2011/0004341 | A1 | 1/2011 | Sarvadevabhatla et al. |
| 2011/0173015 | A1 | 7/2011 | Chapman et al. |
| 2011/0279682 | A1 | 11/2011 | Li et al. |
| 2012/0072215 | A1 | 3/2012 | Yu et al. |
| 2012/0089552 | A1 | 4/2012 | Chang et al. |
| 2012/0197596 | A1 | 8/2012 | Comi |
| 2012/0316786 | A1 * | 12/2012 | Liu ........................ G01V 1/303 702/2 |
| 2013/0126703 | A1 | 5/2013 | Caulfield |
| 2013/0131985 | A1 | 5/2013 | Weiland et al. |
| 2014/0019392 | A1 | 1/2014 | Buibas et al. |
| 2014/0032461 | A1 | 1/2014 | Weng |
| 2014/0052679 | A1 | 2/2014 | Sinyavskiy et al. |
| 2014/0089232 | A1 | 3/2014 | Buibas et al. |
| 2014/0192073 | A1 | 7/2014 | Gorchetchnikov et al. |
| 2015/0127149 | A1 | 5/2015 | Sinyavskiy et al. |
| 2015/0134232 | A1 | 5/2015 | Robinson |
| 2015/0224648 | A1 | 8/2015 | Lee et al. |
| 2015/0269439 | A1 | 9/2015 | Versace et al. |
| 2016/0075017 | A1 | 3/2016 | Laurent et al. |
| 2016/0082597 | A1 | 3/2016 | Gorchetchnikov et al. |
| 2016/0096270 | A1 | 4/2016 | Ibarz Gabardos et al. |
| 2017/0024877 | A1 | 1/2017 | Versace et al. |
| 2017/0076194 | A1 | 3/2017 | Versace et al. |
| 2017/0193298 | A1 | 7/2017 | Versace et al. |

FOREIGN PATENT DOCUMENTS

| | | |
|---|---|---|
| WO | WO 2015/143173 | 9/2015 |
| WO | WO 2016/014137 | 1/2016 |

OTHER PUBLICATIONS

Apolloni, B. et al., Training a network of mobile neurons, Proceedings of International Joint Conference on Neural Networks, San Jose, CA, doi: 10.1109/IJCNN.2011.6033427, pp. 1683-1691 (Jul. 31-Aug. 5, 2011).

Boddapati, V., Classifying Environmental Sounds with Image Networks, Thesis, Faculty of Computing Blekinge Institute of Technology, 37 pages (Feb. 2017).

Khaligh-Razavi, S. -M. et al., Deep Supervised, but Not Unsupervised, Models May Explain IT Cortical Representation, PLoS Computational Biology, vol. 10, Issue 11, 29 pages (Nov. 2014).

Kim, S., Novel approaches to clustering, biclustering and algorithms based on adaptive resonance theory and intelligent control, Doctoral Dissertations, Missouri University of Science and Technology, 125 pages (2016).

Notice of Alllowance dated May 22, 2018 from U.S. Appl. No. 15/262,637, 6 pages.

Ren, Y. et al., Ensemble Classification and Regression—Recent Developments, Applications and Future Directions, in IEEE Computational Intelligence Magazine, 10.1109/MCI.2015.2471235, 14 pages (2016).

Sun, Z. et al., Recognition of SAR target based on multilayer auto-encoder and SNN, International Journal of Innovative Computing, Information and Control, vol. 9, No. 11, pp. 4331-4341, Nov. 2013.

Non-Final Office Action dated Jan. 4, 2018 from U.S. Appl. No. 15/262,637, 23 pages.

Wu, Yan & J. Cai, H. (2010). A Simulation Study of Deep Belief Network Combined with the Self-Organizing Mechanism of Adaptive Resonance Theory. 10.1109/CISE.2010.5677265, 4 pages.

U.S. Appl. No. 15/262,637, filed Sep. 12, 2016, Gorchetchnikov et al.

Adelson, E. H., Anderson, C. H., Bergen, J. R., Burt, P. J., & Ogden, J. M. (1984). Pyramid methods in image processing. RCA engineer, 29(6), 33-41.

Aggarwal, Charu C, Hinneburg, Alexander, and Keim, Daniel A. On the surprising behavior of distance metrics in high dimensional space. Springer, 2001.

Ames, H, Versace, M., Gorchetchnikov, A., Chandler, B., Livitz, G., Léveillé, J., Mingolla, E., Carter, D., Abdalla, H., and Snider, G. (2012) Persuading computers to act more like brains. In Advances in Neuromorphic Memristor Science and Applications, Kozma, R.Pino,R., and Pazienza, G. (eds), Springer Verlag.

Ames, H. Mingolla, E., Sohail, A., Chandler, B., Gorchetchnikov, A., Léveillé, J., Livitz, G. and Versace, M. (2012) The Animat. IEEE Pulse, Feb. 2012, 3(1), 47-50.

U.S. Appl. No. 15/343,673, dated Nov. 4, 2016, Gorchetchnikov et al.

Artificial Intelligence As a Service. Invited talk, Defrag, Broomfield, CO, Nov. 4-6, 2013.

Baraldi, A. and Alpaydin, E. (1998). Simplified ART: A new class of ART algorithms. International Computer Science Institute, Berkeley, CA, TR-98-004, 1998.

Baraldi, A. and Alpaydin, E. (2002). Constructive feedforward ART clustering networks—Part I. IEEE Transactions on Neural Networks 13(3), 645-661.

Baraldi, A. and Parmiggiani, F. (1997). Fuzzy combination of Kohonen's and ART neural network models to detect statistical regularities in a random sequence of multi-valued input patterns. In International Conference on Neural Networks, IEEE.

Baraldi, Andrea and Alpaydin, Ethem. Constructive feedforward ART clustering networks—part II. IEEE Transactions on Neural

(56) References Cited

OTHER PUBLICATIONS

Networks, 13(3):662-677, May 2002. ISSN 1045-9227. doi: 10.1109/tnn.2002.1000131. URL http://dx.doi.org/10.1109/tnn.2002.1000131.
Bengio, Y., Courville, A., & Vincent, P. Representation learning: A review and new perspectives, IEEE Transactions on Pattern Analysis and Machine Intelligence, vol. 35 Issue 8, Aug. 2013 pp. 1798-1828.
Besl, P. J., & Jain, R. C. (1985). Three-dimensional object recognition. ACM Computing Surveys (CSUR), 17(1), 75-145.
Bradski, G., & Grossberg, S. (1995). Fast-learning VIEWNET architectures for recognizing three-dimensional objects from multiple two-dimensional views. Neural Networks, 8 (7-8), 1053-1080.
Brain-inspired computing. Invited keynote address, Bionetics 2010, Boston, MA, USA.
Canny, J.A. (1986). Computational Approach To Edge Detection, IEEE Trans. Pattern Analysis and Machine Intelligence, 8(6):679-698.
Carpenter, G.A. and Grossberg, S. (1987). A massively parallel architecture for a self-organizing neural pattern recognition machine. Computer Vision, Graphics, and Image Processing 37, 54-115.
Carpenter, G.A., and Grossberg, S. (1995). Adaptive resonance theory (ART). In M. Arbib (Ed.), The handbook of brain theory and neural networks. (pp. 79-82). Cambridge, M.A.: MIT press.
Carpenter, G.A., Grossberg, S. and Rosen, D.B. (1991). Fuzzy ART: Fast stable learning and categorization of analog patterns by an adaptive resonance system. Neural Networks 4, 759-771.
Carpenter, Gail A and Grossberg, Stephen. The art of adaptive pattern recognition by a self-organizing neural network. Computer, 21(3):77-88, 1988.
Coifman, R.R. and Maggioni, M. Diffusion wavelets. Applied and Computational Harmonic Analysis, 21(1):53-94, 2006.
Coifman, R.R., Lafon, S., Lee, A.B., Maggioni, M., Nadler, B., Warner, F., and Zucker, S.W. Geometric diffusions as a tool for harmonic analysis and structure definition of data: Diffusion maps. Proceedings of the National Academy of Sciences of the United States of America, 102(21):7426, 2005.
Dosher, B.A., and Lu, Z.L. (2010). Mechanisms of perceptual attention in precuing of location. Vision Res., 40(10-12). 1269-1292.
Fazl, A., Grossberg, S., and Mingolla, E. (2009). View-invariant object category learning, recognition, and search: How spatial and object attention are coordinated using surface-based attentional shrouds. Cognitive Psychology 58, 1-48.
Földiák, P. (1990). Forming sparse representations by local anti-Hebbian learning, Biological Cybernetics, vol. 64, pp. 165-170.
Friston K., Adams R., Perrinet L., & Breakspear M. (2012). Perceptions as hypotheses: saccades as experiments. Frontiers in Psychology, 3 (151), 1-20.
Galbraith, B.V, Guenther, F.H., and Versace, M. (2015) A neural network-based exploratory learning and motor planning system for co-robots.Frontiers in Neuroscience, in press.
George, D. and Hawkins, J. (2009). Towards a mathematical theory of cortical micro-circuits. PLoS Computational Biology 5(10), 1-26.
Grossberg, S. (1973). Contour enhancement, short-term memory, and constancies in reverberating neural networks. Studies in Applied Mathematics 52, 213-257.
Grossberg, S., and Huang, T.R. (2009). ARTSCENE: A neural system for natural scene classification. Journal of Vision, 9 (4), 6.1-19. doi:10.1167/9.4.6.
Grossberg, S., and Versace, M. (2008) Spikes, synchrony, and attentive learning by laminar thalamocortical circuits. Brain Research, 1218C, 278-312 [Authors listed alphabetically].
Hasselt, Hado Van. Double q-learning. In Advances in Neural Information Processing Systems, pp. 2613-2621,2010.
Hinton, G. E., Osindero, S., and Teh, Y. (2006). A fast learning algorithm for deep belief nets. Neural Computation, 18, 1527-1554.
International Preliminary Report on Patentability in related PCT Application No. PCT/US2014/039239 filed May 22, 2014, dated Nov. 24, 2015, 8 pages.
Itti, L., and Koch, C. (2001). Computational modelling of visual attention. Nature Reviews Neuroscience, 2 (3), 194-203.
Itti, L., Koch, C., and Niebur, E. (1998). A Model of Saliency-Based Visual Attention for Rapid Scene Analysis, 1-6.
Jarrett, K., Kavukcuoglu, K., Ranzato, M. A., & LeCun, Y. (Sep. 2009). What is the best multi-stage architecture for object recognition?. In Computer Vision, 2009 IEEE 12th International Conference on (pp. 2146-2153). IEEE.
Kompella, Varun Raj, Luciw, Matthew, and Schmidhuber, Jurgen. Incremental slow feature analysis: Adaptive low-complexity slow feature updating from high-dimensional input streams. Neural Computation, 24(11):2994-3024, 2012.
Kowler, E. (2011). Eye movements: The past 25years. Vision Research, 51(13), 1457-1483. doi:10.1016/j.visres.2010.12.014.
Larochelle H., & Hinton G. (2012). Learning to combine foveal glimpses with a third-order Boltzmann machine. NIPS 2010,1243-1251.
LeCun, Y., Kavukcuoglu, K., & Farabet, C. (May 2010). Convolutional networks and applications in vision. In Circuits and Systems (ISCAS), Proceedings of 2010 IEEE International Symposium on (pp. 253-256). IEEE.
Lee, D. D. and Seung, H. S. (1999). Learning the parts of objects by non-negative matrix factorization. Nature, 401(6755):788-791.
Lee, D. D., and Seung, H. S. (1997). "Unsupervised learning by convex and conic coding." Advances in Neural Information Processing Systems, 9.
Legenstein, R., Wilbert, N., and Wiskott, L. Reinforcement learning on slow features of high-dimensional input streams. PLoS Computational Biology, 6(8), 2010. ISSN 1553-734X.
Léveillé, J., Ames, H., Chandler, B., Gorchetchnikov, A., Mingolla, E., Patrick, S., and Versace, M. (2010) Learning in a distributed software architecture for large-scale neural modeling. BIONETICS10, Boston, MA, USA.
Livitz G., Versace M., Gorchetchnikov A., Vasilkoski Z., Ames H., Chandler B., Leveille J. and Mingolla E. (2011) Scalable adaptive brain-like systems, The Neuromorphic Engineer, : 10.2417/1201101.003500 Feb. 2011.
Livitz, G., Versace, M., Gorchetchnikov, A., Vasilkoski, Z., Ames, H., Chandler, B., Léveillé, J., Mingolla, E., Snider, G., Amerson, R., Carter, D., Abdalla, H., and Qureshi, S. (2011) Visually-Guided Adaptive Robot (ViGuAR). Proceedings of the International Joint Conference on Neural Networks (IJCNN) 2011, San Jose, CA, USA.
Lowe, D.G.(2004). Distinctive Image Features from Scale-Invariant Keypoints. Journal International Journal of Computer Vision archive vol. 60, 2, 91-110.
Lu, Z.L., Liu, J., and Dosher, B.A. (2010) Modeling mechanisms of perceptual learning with augmented Hebbian re-weighting. Vision Research, 50(4). 375-390.
Mahadevan, S. Proto-value functions: Developmental reinforcement learning. In Proceedings of the 22nd international conference on Machine learning, pp. 553-560. ACM, 2005.
Mishkin M, Ungerleider LG. (1982). "Contribution of striate inputs to the visuospatial functions of parieto-preoccipital cortex in monkeys," Behav Brain Res, 6 (1): 57-77.
Mnih, Volodymyr, Kavukcuoglu, Koray, Silver, David, Rusu, Andrei A, Veness, Joel, Bellemare, Marc G, Graves, Alex, Riedmiller, Martin, Fidjeland, Andreas K, Ostrovski, Georg, et al. Human-level control through deep reinforcement learning. Nature, 518(7540):529-533, Feb. 25, 2015.
Moore, Andrew W and Atkeson, Christopher G. Prioritized sweeping: Reinforcement learning with less data and less time. Machine Learning, 13(1):103-130, 1993.
Najemnik, J., and Geisler, W. (2009). Simple summation rule for optimal fixation selection in visual search. Vision Research. 49, 1286-1294.
Notice of Allowance dated Jul. 27, 2016 from U.S. Appl. No. 14/662,657.
Oja, E. (1982). Simplified neuron model as a principal component analyzer. Journal of Mathematical Biology 15(3), 267-273.
Raijmakers, M.E.J., and Molenaar, P. (1997). Exact ART: A complete implementation of an ART network Neural networks 10 (4), 649-669.

(56) References Cited

OTHER PUBLICATIONS

Ranzato, M. A., Huang, F. J., Boureau, Y. L., & Lecun, Y. (Jun. 2007). Unsupervised learning of invariant feature hierarchies with applications to object recognition. In Computer Vision and Pattern Recognition, 2007. CVPR'07. IEEE Conference on (pp. 1-8). IEEE.
Raudies, F., Eldridge, S., Joshi, A., and Versace, M. (Aug. 20, 2014). Learning to navigate in a virtual world using optic flow and stereo disparity signals. Artificial Life and Robotics, DOI 10.1007/s10015-014-0153-1.
Riesenhuber, M., & Poggio, T. (1999). Hierarchical models of object recognition in cortex. Nature Neuroscience, 2 (11), 1019-1025.
Riesenhuber, M., & Poggio, T. (2000). Models of object recognition. Nature neuroscience, 3, 1199-1204.
Rublee, E., Rabaud, V., Konolige, K., & Bradski, G. (2011). ORB: An efficient alternative to SIFT or SURF. In IEEE International Conference on Computer Vision (ICCV) 2011, 2564-2571.
Rumelhart D., Hinton G., and Williams, R. (1986). Learning internal representations by error propagation. In Parallel distributed processing: explorations in the microstructure of cognition, vol. 1, MIT Press.
Salakhutdinov, R., & Hinton, G. E. (2009). Deep boltzmann machines. In International Conference on Artificial Intelligence and Statistics (pp. 448-455).
Schaul, Tom, Quan, John, Antonoglou, Ioannis, and Silver, David. Prioritized experience replay. arXiv preprint arXiv: 1511.05952, Nov. 18, 2015.
Schmidhuber, J. (2010). Formal theory of creativity, fun, and intrinsic motivation (1990-2010). Autonomous Mental Development, IEEE Transactions on, 2(3), 230-247.
Schmidhuber, Jürgen. Curious model-building control systems. In Neural Networks, 1991. 1991 IEEE International Joint Conference on, pp. 1458-1463. IEEE, 1991.
Seibert, M., & Waxman, A.M. (1992). Adaptive 3-D Object Recognition from Multiple Views. IEEE Transactions on Pattern Analysis and Machine Intelligence, 14 (2), 107-124.
Sherbakov, L. and Versace, M. (2014) Computational principles for an autonomous active vision system. Ph.D., Boston University, http://search.proquest.com/docview/1558856407.
Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013.
Sherbakov, L., Livitz, G., Sohail, A., Gorchetchnikov, A., Mingolla, E., Ames, H., and Versace, M (2013b) A computational model of the role of eye-movements in object disambiguation. Cosyne, Feb. 28-Mar. 3, 2013. Salt Lake City, UT, USA.
Smolensky, P. (1986). Information processing in dynamical systems: Foundations of harmony theory. In D. E.
Snider, G., Amerson, R., Carter, D., Abdalla, H., Qureshi, S., Laveille, J., Versace, M., Ames, H., Patrick, S., Chandler, B., Gorchetchnikov, A., and Mingolla, E. (2010) Adaptive Computation with Memristive Memory. IEEE Computer, vol. 44(2).
Spratling, M. W. (2008). Predictive coding as a model of biased competition in visual attention. Vision Research, 48(12):1391-1408.
Spratling, M. W. (2012). Unsupervised learning of generative and discriminative weights encoding elementary image components in a predictive coding model of cortical function. Neural Computation, 24(1):60-103.
Spratling, M. W., De Meyer, K., and Kompass, R. (2009). Unsupervised learning of overlapping image components using divisive input modulation. Computational intelligence and neuroscience.
Sprekeler, H. On the relation of slow feature analysis and laplacian eigenmaps. Neural Computation, pp. 1-16, 2011.
Sutton, R. S., and Barto, A. G. (1998). Reinforcement learning: An introduction(vol. 1, No. 1). Cambridge: MIT press.
TEDx Fulbright, Invited talk, Washington DC, Apr. 5, 2014.

Tong, F., Ze-Nian Li, (1995). Reciprocal-wedge transform for space-variant sensing, Pattern Analysis and Machine Intelligence, IEEE Transactions on , vol. 17, No. 5, pp. 500-551. doi: 10.1109/34.391393.
Torralba, A., Oliva, A., Castelhano, M.S., Henderson, J.M. (2006). Contextual guidance of eye movements and attention in real-world scenes: the role of global features in object search. Psychological Review, 113(4).766-786.
Van Hasselt, Hado, Guez, Arthur, and Silver, David. Deep reinforcement learning with double q-learning. arXiv preprint arXiv: 1509.06461, Sep. 22, 2015.
Versace, M. (2006) From spikes to interareal synchrony: how attentive matching and resonance control learning and information processing by laminar thalamocortical circuits. NSF Science of Learning Centers PI Meeting, Washington, DC, USA.
Versace, M., (2010) Open-source software for computational neuroscience: Bridging the gap between models and behavior. In Horizons in Computer Science Research,vol. 3.
Versace, M., Ames, H., Léveillé, J., Fortenberry, B., and Gorchetchnikov, A. (2008) KInNeSS: A modular framework for computational neuroscience. Neuroinformatics, 2008 Winter; 6(4):291-309. Epub Aug. 10, 2008.
Versace, M., and Chandler, B. (2010) MoNETA: A Mind Made from Memristors. IEEE Spectrum, Dec. 2010.
Webster, Bachevalier, Ungerleider (1994). Connections of IT areas TEO and TE with parietal and frontal cortex in macaque monkeys. Cerebal Cortex, 4(5), 470-483.
Wiskott, Laurenz and Sejnowski, Terrence. Slow feature analysis: Unsupervised learning of invariances. Neural Computation, 14(4):715-770, 2002.
Aryananda, L. 2006. Attending to learn and learning to attend for a social robot. Humanoids 06, pp. 618-623.
Bernhard, F., and Keriven, R. 2005. Spiking Neurons on GPUs. Tech. Rep. May 2015, Ecole Nationale des Ponts et Chauss'es, 8 pages.
Bohn, C.-A. Kohonen. 1998. Feature Mapping Through Graphics Hardware. In Proceedings of 3rd Int. Conference on Computational Intelligence and Neurosciences, 4 pages.
Davis, C. E. 2005. Graphic Processing Unit Computation of Neural Networks. Master's thesis, University of New Mexico, Albuquerque, NM, 121 pages.
Extended European Search Report and Written Opinion dated Oct. 12, 2017 from European Application No. 14800348.6, 12 pages.
Extended European Search Report and Written Opinion dated Oct. 23, 2017 from European Application No. 15765396.5, 8 pages.
Ellias, S. A., and Grossberg, S. 1975. Pattern formation, contrast control and oscillations in the short term memory of shunting on-center off-surround networks. Biol Cybern 20, pp. 69-98.
Georgii, J., and Westermann, R. 2005. Mass-spring systems on the GPU. Simulation Modelling Practice and Theory 13, pp. 693-702.
Gorchetchnikov, A. 2017. An Approach to a Biologically Realistic Simulation of Natural Memory. Master's thesis, Middle Tennessee State University, Murfreesboro, TN, 70 pages.
Gorchetchnikov A., Versace M., Hasselmo M. E. (2005). A Model of STDP Based on Spatially and Temporally Local Information: Derivation and Combination with Gated Decay. Neural Networks, 18, pp. 458-466.
Gorchetchnikov A., Versace M., Hasselmo M. E. (2005). Spatially and temporally local spike-timing-dependent plasticity rule. In: Proceedings of the International Joint Conference on Neural Networks, No. 1568 in IEEE CD-ROM Catalog No. 05CH37662C, pp. 390-396.
Gorchetchnikov A., Hasselmo M. E. (2005). A simple rule for spike-timing-dependent plasticity: local influence of AHP current. Neurocomputing, 65-66, pp. 885-890.
Gorchetchnikov A., Hasselmo M. E. (2005). A biophysical implementation of a bidirectional graph search algorithm to solve multiple goal navigation tasks. Connection Science, 17(1-2), pp. 145-166.
Hagen, T. R., Hjelmervik, J., Lie, K.-A., Natvig, J., and Ofstad Henriksen, M. 2005. Visual simulation of shallow-water waves. Simulation Modelling Practice and Theory 13, pp. 716-726.

(56) References Cited

OTHER PUBLICATIONS

Hodgkin, A. L., and Huxley, A. F. 1952. Quantitative description of membrane current and its application to conduction and excitation in nerve. J Physiol 117, pp. 500-544.
Hopfield, J. 1982. Neural networks and physical systems with emergent collective computational abilities. In Proc Natl Acad Sci USA, vol. 79, pp. 2554-2558.
Ilie, A. 2002. Optical character recognition on graphics hardware. Tech. Rep. integrative paper, UNCCH, Department of Computer Science, 9 pages.
Kolb, A., L. Latta, and C. Rezk-Salama. 2004. "Hardware-Based Simulation and Collision Detection for Large Particle Systems." In Proceedings of the SIGGRAPH/Eurographics Workshop on Graphics Hardware 2004, pp. 123-131.
Kipfer, P., Segal, M., and Westermann, R. 2004. UberFlow: A GPU-Based Particle Engine. In Proceedings of the SIGGRAPH/Eurographics Workshop on Graphics Hardware 2004, pp. 115-122.
Meuth, J.R. and Wunsch, D.C. (2007) A Survey of Neural Computation on Graphics Processing Hardware. 22nd IEEE International Symposium on Intelligent Control, Part of IEEE Multi-conference on Systems and Control, Singapore, Oct. 1-3, 2007, 5 pages.
Oh, K.-S., and Jung, K. 2004. GPU implementation of neural networks. Pattern Recognition 37, pp. 1311-1314.
Rolfes, T. 2004. Artificial Neural Networks on Programmable Graphics Hardware. In Game Programming Gems 4, A. Kirmse, Ed. Charles River Media, Hingham, MA, pp. 373-378.
Ruesch, J. et al. 2008. Multimodal Saliency-Based Bottom-Up Attention A Framework for the Humanoid Robot iCub. 2008 IEEE International Conference on Robotics and Automation, pp. 962-965.
Rumpf, M. and Strzodka, R. Graphics processor units: New prospects for parallel computing. In Are Magnus Bruaset and Aslak Tveito, editors, Numerical Solution of Partial Differential Equations on Parallel Computers, vol. 51 of Lecture Notes in Computational Science and Engineering, pp. 89-134. Springer, 2005.
Sherbakov, L. et al. 2012. CogEye: from active vision to context identification, youtube, retrieved from the Internet on Oct. 10, 2017: URL://www.youtube.com/watch?v=i5PQk962B1k, 1 page.
Sherbakov, L. et al. 2013. CogEye: system diagram module brain area function algorithm approx # neurons, retrieved from the Internet on Oct. 12, 2017: URL://http://www-labsticc.univ-ubs.fr/~coussy/neucomp2013/index_fichiers/material/posters/NeuComp2013_final56x36.pdf, 1 page.
U.S. Appl. No. 15/463,299, filed Mar. 20, 2017, Versace et al.
Extended European Search Report and Written Opinion dated Jun. 1, 2017 from European Application No. 14813864.7, 10 pages.
International Preliminary Report on Patentability dated Nov. 8, 2016 from International Application No. PCT/US2015/029438, 7 pages.
International Search Report and Written Opinion dated Feb. 18, 2015 from International Application No. PCT/US2014/039162, 12 pages.
International Search Report and Written Opinion dated Feb. 23, 2016 from International Application No. PCT/US2015/029438, 11 pages.
International Search Report and Written Opinion dated Nov. 26, 2014 from International Application No. PCT/US2014/039239, 14 pages.
International Search Report and Written Opinion dated Sep. 15, 2015 from International Application No. PCT/US2015/021492, 9 pages.
Notice of Allowance dated Dec. 16, 2016 from U.S. Appl. No. 14/662,657.
International Preliminary Report on Patentability in related PCT Application No. PCT/US2014/039162 filed May 22, 2014, dated Nov. 24, 2015, 7 pages.
Berenson, D. et al., A robot path planning framework that learns from experience, 2012 International Conference on Robotics and Automation, 2012, 9 pages [retrieved from the internet] URL:http://users.wpi.edu/-dberenson/lightning.pdf.
International Search Report and Written Opinion dated Jul. 6, 2017 from International Application No. PCT/US2017/029866, 12 pages.
Partial Supplementary European Search Report dated Jul. 4, 2017 from European Application No. 14800348.6, 13 pages.

* cited by examiner

METHODS AND APPARATUS FOR ITERATIVE NONSPECIFIC DISTRIBUTED RUNTIME ARCHITECTURE AND ITS APPLICATION TO CLOUD INTELLIGENCE

CROSS-REFERENCE TO RELATED PATENT APPLICATION

This application is a bypass continuation of International Application No. PCT/US14/39162, entitled "Methods and Apparatus for Iterative Nonspecific Distributed Runtime Architecture and its Application to Cloud Intelligence," which was filed on May 22, 2014 and which claims priority, under 35 U.S.C. § 119(e), from U.S. Application No. 61/826,380, filed May 22, 2013, and entitled "Iterative Nonspecific Distributed Runtime Architecture." Each of these applications is hereby incorporated herein by reference in its entirety.

GOVERNMENT SUPPORT

This invention was made with government support under Contract No. FA8750-12-C-0123 awarded by the U.S. Air Force. The government has certain rights in the invention.

BACKGROUND

Current computer hardware central processor architectures and often even graphic processor enabled workstations are often unable to achieve the highly parallel requirements needed to perform computationally expensive massive data-driven algorithms, especially those that are based on dynamic systems approach.

SUMMARY

The system and methods described herein are based on a network of processing nodes that can be individual heterogeneous workstations or a cluster of homogeneous computer boards. An example of the system enables a runtime architecture based on this hardware to load a nonspecific set of systems of differential equations, distribute them across network nodes according to hardware capabilities of each node, and iteratively integrate them through time with a possibility to output the results on every iteration. An exemplary system may be used for a variety of applications, including but not limited to neural computations. For instance, an exemplary system can be used as a standalone computational engine engaged on a hardware cluster directly or as a part of other computational software that at some point uses massively parallel numerical integration of data driven dynamical systems on a network of remote computational hardware. Furthermore, a resulting computational engine can serve as a remote (e.g., cloud) back end that can engage remote hardware resources to support local autonomous hardware devices such as robots, automatic household devices, mobile navigators, and other devices.

In some implementations, a method for processing sensory data in parallel may comprise receiving, at a master node, a request to process incoming sensor data, receiving, from the master node, a selection of a set of slave nodes, the set of slave nodes selected from a set of nodes capable of processing the incoming sensor data, and establishing a connection between the master node and the set of slave nodes. For at least one slave node in the set of slave nodes, the implementation may further include determining a dynamic system model for a portion of the incoming sensor data received by the at least one slave node, distributing, from the master node to the at least one slave node, a representation of the dynamic system model and a representation of corresponding graph connections between slave nodes in the set of slave nodes, instantiating at least one local data structure for processing the incoming sensor data based at least in part upon the representation of the dynamic system model distributed earlier, connecting the at least one slave node to other slave nodes in the set of slave nodes according to the representation of the graph connections distributed earlier, receiving a signal from the master node to process the incoming sensor data; and iteratively processing the incoming sensor data using the at least one local data structure instantiated previously.

In some implementations, the process may also comprise selecting the set of slave nodes automatically, or selecting the set of slave nodes according to user input. In some implementations, distributing the representation of the dynamic system model may further comprise assigning at least one system of equations corresponding to the dynamical system model to the at least one slave node based on at least one of computational power of the at least one slave node, computational complexity of the at least one system of equations, and communication between parts of a dynamical system represented by the dynamical system model. Distributing the representation of the dynamic system model may also comprise assigning, by the at least one slave node, a set of computational threads for processing at least a portion of the incoming sensor data.

In some implementations, connecting the at least one slave node to other slave nodes may further comprise determining an operating mode of the master node, and connecting the master node to the at least one slave node based on the operating mode of the master node. In some implementations, this may further comprise connecting the master node to the at least one slave node via a network connection if the master node is configured to operate in a networked mode, and compiling the slave node into the master node if the master node is configured to operate in a standalone mode. In some implementations the master node is configured to operate in a networked mode or a standalone mode based on available resources, and is configured to operate in the networked mode if the master node is able to connect to a network and if there is at least one slave node connected to the network.

In some implementations, processing the data may further comprise storing results of the iterative processing in a data queue in the at least one slave node for communication with the other slave nodes in the set of slave nodes, and storing results of the iterative processing in a storage medium for off-line analysis.

An exemplary system for processing and forwarding slave node data may comprise a first slave node operatively coupled to an outgoing axonal queue associated with a system of equations processed on the first slave node, a shadow axonal queue corresponding to respective outgoing axonal queues of other slave nodes configured to provide input data to the first slave node, a set of synaptic queues corresponding to the system of equations processed on the first slave node, the set of synaptic queues configured to preprocess the input data received from the shadow axonal queue, and a processing device, operably coupled to the set of synaptic queues, to apply the system of equations to the input data preprocessed by the synaptic queue so as to generate at least one output data value. The system may further comprise a local outgoing axonal queue, operatively coupled to the processing device, to receive the at least one output data value from the processing device and to provide the at least one output data value to a second shadow axonal queue in at least one of the first slave node or a second slave node. The shadow axonal queue may be configured to receive at least one data value from a corresponding outgoing axonal queue operatively coupled to a slave node.

The outgoing axonal queues and shadow axonal queues can be implemented with a standard template library (STL) class called multimap that holds key-value pairs. The key in the key-value pair may be event production time and the value in the key-value pair can include for example receiver address and output value. STL multimap does automatic sorting by key, so this queue may have output events sorted by their production times. The synaptic queue can also be implemented with a standard template library (STL) class called multimap that holds key-value pairs, except that the receiver address is no longer needed, the timing represents delivery time rather than production time, and the value in the key-value pair is adjusted according to the parameters of the synapse.

An exemplary system for aggregating and processing sensor data from a robot comprising a local processor that implements a local brain may comprise at least one slave node, located on a computer network, to implement a cloud brain for receiving and processing the sensor data from the robot, the first processor including a main memory module to store the sensor data from the robot, and a communications device, operably coupled to the main memory module, to transmit at least a portion of the sensor data to the local brain implemented in the local processor of the robot and to receive, from the local brain, at least one data value based at least in part on the at least a portion of the sensor data and on a current state of the local brain.

The main memory module may store a representation of at least one of an outgoing axonal queue associated with a system of equations processed on a first slave node, a shadow axonal queue corresponding to respective outgoing axonal queue of a second slave node configured to provide input data to the first slave node, a synaptic queues corresponding to the system of equations processed on the first slave node, the set of synaptic queues configured to preprocess the input data received from the shadow axonal queue, and a data structure for processing the sensor data from the robot. The communications device is operably coupled to another local brain implemented in another robot and configured to transmit the at least one data value to the other local brain. The communications device may be further configured to transmit data from a dedicated memory block in the main memory module to the other local brain and to receive, from the other local brain, at least one other data value based at least in part on the data from the dedicated memory block.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3A shows data flow during system and model setup. FIG. 3B shows the data flow during the computation.

DETAILED DESCRIPTION

The system and methods described herein relate to a hardware computational engine consisting of two or more computational nodes such as workstations or cluster components connected through a wired or wireless network. In some implementations, the engine underlies and subserves neural simulations and/or other simulations. The system employs network communication management, thread management, event based communication, over the network data exchange, and data structures used to facilitate the functionality herein.

In some implementations, the system includes a computer readable memory onto which processor executable instructions are written. The computer readable memory can store a plurality of libraries. For example, the system on a slave computational node may include: a pthreads library that is used to manage multithreaded control flow; a standard template library (STL) that may be used for structuring the data; and a CUDA or OpenCL library to control execution on graphic processors. In some implementations, the graphics processor unit (GPU) libraries may not be required. The system on the master node may include additional libraries for graphic user interface and data visualization and/or other additional libraries and/or like information.

Figures 1A, 1B:
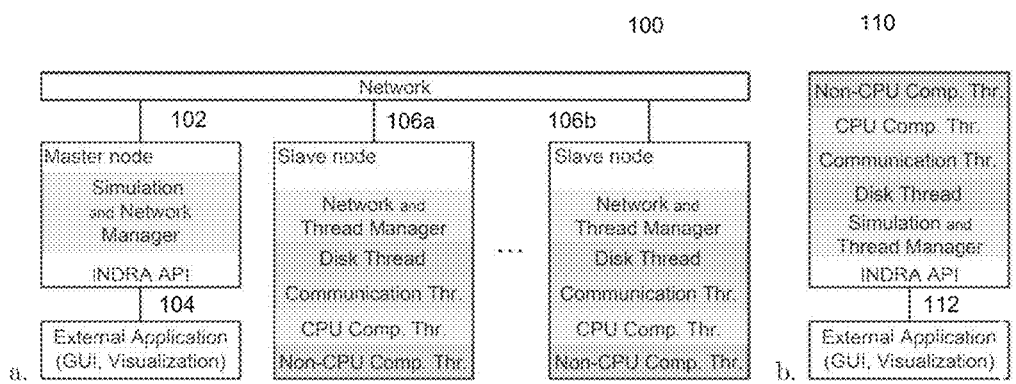
FIGS. 1A and 1B are diagrams of a networked system and a standalone system each implementing Iterative Nonspecific Distributed Runtime Architectures, respectively, according to illustrative implementations.

FIG. 1A is a system diagram of a networked implementation 100 of an Iterative Nonspecific Distributed Runtime Architecture (INDRA). The networked implementation 100 includes a single master node 102 receiving commands through an application programming interface (API) and controlling an arbitrary number of slave nodes 106a-b. FIG. 1B shows a standalone version 108 of an INDRA receiving commands through the same API (master part) 110 and executing the commands through a simplified version of a slave node 112 created and connected to locally by the master node (e.g., the slave node 112 may be directly merged into the master node).

As illustrated in FIG. 1A, the structure of the system 100 comprises a single master node 102 and an arbitrary number of slave nodes 106a, 106b, . . . (collectively, slave nodes 106). The master node 102 is a computing hardware component where a user or an external application can instantiate the engine control structures (those engine control structures including but not limited to a parser that converts user provided description of a dynamical system in machine readable data structures, a network communication manager that establishes connections with slaves, and a command and synchronization module that passes commands (e.g. run, stop, reset) and synchronization signals from master to the slaves). It can be implemented as a user controlled workstation, portable electronic device, or as an autonomous electronic device such as robot. The engine control structures may initiate engine execution on remote computer systems serving as slave nodes 106 to the engine, gather the information about available hardware resources for each slave (CPU cores, GPUs, memory), and distribute the dynamical systems, which may take the form of neuronal populations (or systems of differential or algebraic equations) and corresponding synapses (event-based dependencies between these equations) across the slave nodes 106.

As used herein, a dynamical system is a set of systems of differential and or algebraic equations that describe some natural process through time. A neural model is a subset of a dynamical system where equations represent neuronal dynamics. A neuronal population is a part of a neural model that comprises at least one neuronal element and for all neuronal elements the governing system of equations is identical up to a parameter choice. A synapse is a dependency between two neuronal elements that can be in the same or different populations such that it connects a source neuronal element with the target neuronal element and passes output events from the source to the target according to some rule defined by the user.

Figure 2:
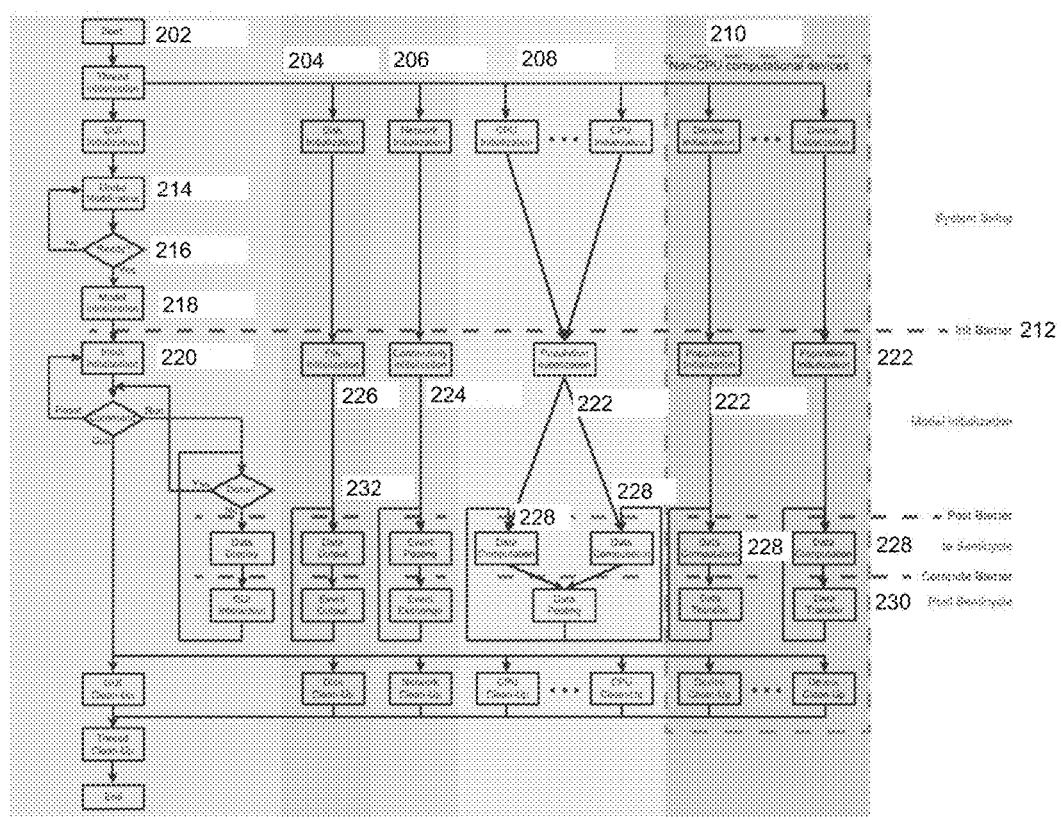
FIG. 2 is a flow chart of the control flow through the systems of FIGS. 1A and 1B, according to one illustrative implementation.
Figure 3A:
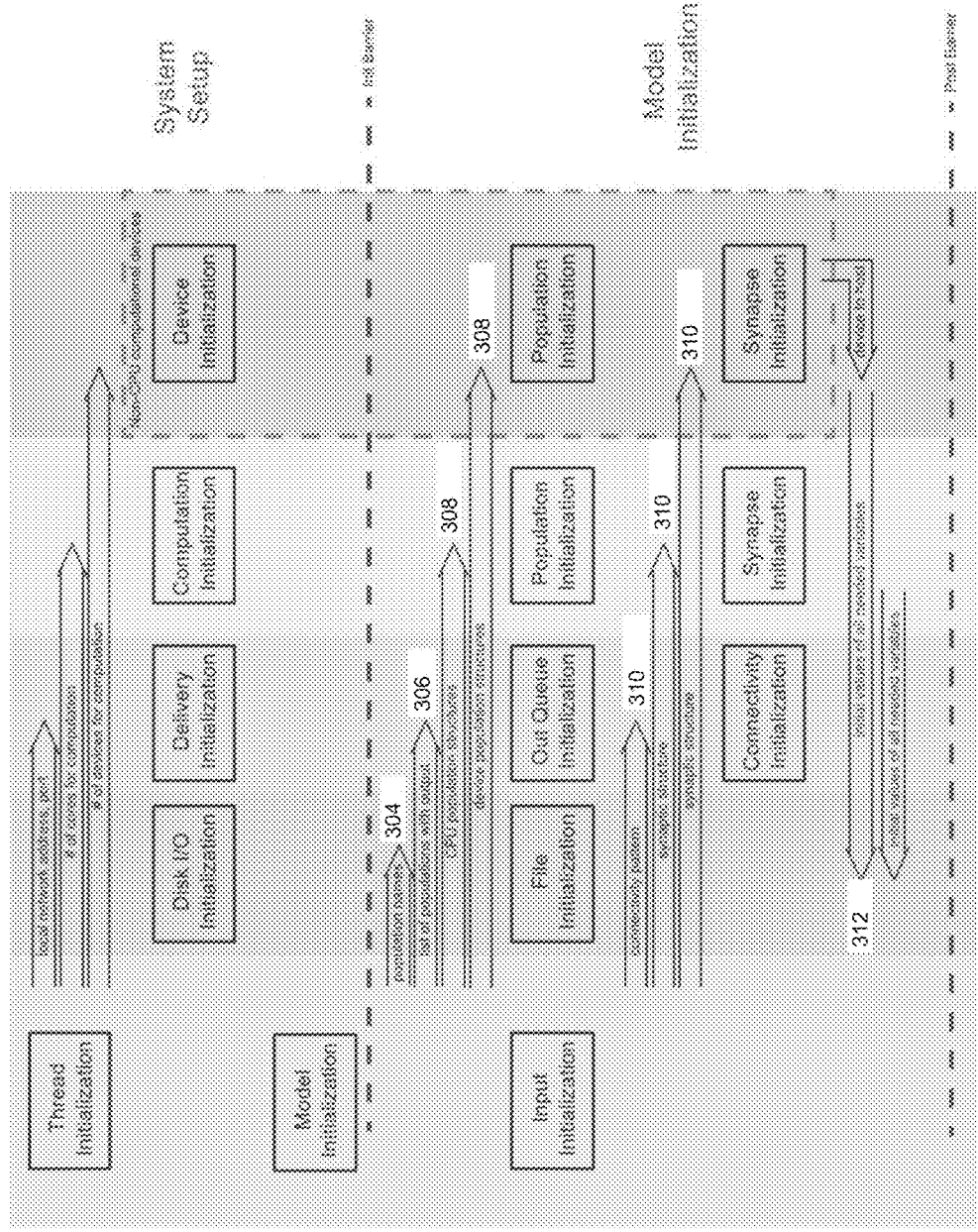
FIGS. 3A and 3B illustrate data flow on the slave hardware nodes of system of FIG. 1A and standalone system of FIG. 1B, according to illustrative implementations.

The above tasks correspond to the System Setup and Model Initialization phases of the example flow chart in FIG. 2 and example data exchange diagram in FIG. 3A. During these stages the slave nodes 106 receive network communication from the master node control structures and instantiate local data structures, allocate hardware memory, query processing devices, and otherwise prepare to perform the computation on the local hardware.

The dynamical system may comprise a set of populations, where each population is a collection of identical systems of equations, and where each element in a population is a computational element.

Each computational element may have output variables that affect the rest of the system. For example, in the case of a neural model, the output of a neuron may be those output variables. A computational element also may have several internal variables that are used to compute output variables, but are not exposed to the rest of the system, not even to other elements of the same population, typically. Each of these variables is represented as a CPU or GPU memory chunk. An exemplary difference between output variables and internal variables is their access: output variables may be made available to other computational elements either directly or through generation of output events, while internal variables may be hidden from other computational elements.

An example implementation of a computational element data structure may be a TVariable class. TVariable class may be based on a TBasicBuffer template class, which may be part of a libSMARTIO (Sensory-Motor Asynchronous Real Time Input Output) library that provides the basic structure and connectivity between populations in the dynamical system. Other portions of TBasicBuffer may allow the system to acquire sensory input from the environment (TInputBuffer) and deliver action output to the agent (TOutputBuffer), both in real time. In some implementations, TBasicBuffer objects may have a name, a number of elements, an index of a non-CPU device, and may facilitate saving variable values, accessing values for various computations, and/or may have other attributes or methods. In some implementations, a TVariable data structure may include connections to an input source, a number of equations associated with the data structure, an event connection that may look for events on a local receiver and process them, and/or may include other attributes and/or methods.

TVariable may also provide memory allocation and methods to maintain a population (array) of variables governed by a system of equations. For example, if a dynamical system has a system of equations with variables x1, x2, and x3, an example implementation may use a TVariable-based class. If there are 100 processes in the dynamical system, each of which is governed by the same system of equations with these three variables, then TVariable-based class may contain 100 elements with 3-component system each. Classes derived from TVariable class may perform initialization procedures, assignment of pointers to equations and numerical methods, and implement different computational backends based on available hardware such as GPU or CPU. They may also provide different implementations of the above methods depending on whether the system is used in a standalone or networked mode.

Output variables are usually accessed by any element in the system during every time step. The value of the output variable that is accessed by other elements of the system corresponds to the value computed on the previous, not the current, time step. This is realized by dedicating two CPU or GPU memory chunks to output variables—one holds the value computed during the previous time step and is accessible to all computational elements during the current time step, another is not accessible to other elements and is used to accumulate new values for the variable computed during the current time step. In-between time steps these two CPU or GPU memory chunks are switched, so that newly accumulated values serve as accessible input during the next time step, while the old input is replaced with new values of the variable. This switch is implemented by swapping the address pointers to respective CPU or GPU memory chunks. The portion of the time step during which the system computes new values is termed a Compute Semicycle in FIG. 2 and the portion of the time step when pointers are switched and new values become available to the rest of the system is termed a Post Semicycle (e.g., see FIG. 2).

Internal variables are computed and used within the same computational element There is no chance of a race condition in which the value is used before it is computed or after it has already changed on the next time step because within an element the processing is sequential. Therefore, it is possible to compute the new value of internal variable and store it in the same memory location in the memory bank where the old value was read from during the computation.

During the computation, the master node 102 utilizes network connections with the slave nodes 106 to synchronize the processing across the nodes 102, 106. This corresponds to Compute and Post Semicycles of the example flow chart in FIG. 2 and example data flow chart in FIG. 3B. In some implementations, the system includes a user interface on the master node that allows direct control of the software operations through computer peripherals such as keyboards, mice, trackballs and other devices. The system can also include an external application 104 that provides information about neural populations. The system may be accessed through API calls by a third party software.

Slave nodes may have a network manager that establishes point-to-point links between their respective hardware devices for sending and receiving of events. The system may also include a thread manager that controls creation, execution, synchronization and/or destruction of working threads within each slave node to maximize hardware utilization. A list of these threads is shown in the FIGS. 2, 3A, and 3B. The threading structure in the depicted example implementation is based on U.S. Pat. No. 8,648,867, which is hereby incorporated herein by reference in its entirety. An example threading structure can include a disk thread that controls the disk output of a node (utilizing a local hard drive of a workstation or a shared disk space of a cluster), opens and closes the files, and does the output for the state variables that are marked for output by the user. Another example thread is communication thread that controls the exchange of output events between neuronal populations or systems of equations within the node and across the network. Other example threads may include non-central processing unit (CPU) computational threads which may be used for computation of neuronal populations on suitable processing devices (e.g., GPUs). In some embodiments, one or more Non-CPU Computational threads are created for each utilized device on the node. Further examples may include CPU Computational threads, which may be used for computation of neuronal populations or systems of equations on available cores of the central processing unit of the slave node. In some implementations, the number of CPU computational threads may be determined by taking the number of cores on the node, subtracting the number of all other threads including the main thread and use the result as the number of CPU Computational threads. In some implementations, for small populations or systems of equations having only one CPU Computational thread might be more efficient.

FIG. 1B illustrates a standalone version 110 in which the control structures of the master node and the computational structures of the slave node are hosted together in (or merged together into) a single software unit that is executed on a standalone workstation or other computer hardware. In such implementations of the system, commutations between the systems of equations may happen on the same node. In this implementation of the system a user or external application may initiate the simulation and thread manager directly, and the network management and across-network synchronization may be removed from the system. Everything under the thread manager may remain identical to a slave node 106 in the networked version 100 shown in FIG. 1A. In some implementations, an INDRA system may allow switching between instantiating a networked implementation 100 and a standalone version 110 depending on available resources at the moment of instantiation.

FIG. 2 illustrates the control flow through a standalone version of the system (e.g., as shown in FIG. 1A). An external application may initiate the engine by starting a simulation and/or thread manager (202). The thread manager may fork and initialize a requested number of computational threads plus one disk I/O thread (204) and one communication thread (206). During thread initialization, the thread manager may pass network addresses, number of CPU cores (208) and GPU devices (210) to the communication and/or computational threads on the node as illustrated in FIG. 3A. These threads may become initialized and gather on the initialization barrier 212 waiting for the simulation manager to prepare the model and simulation setup. The physical location of the simulation manager may differ between the networked implementation and the standalone implementation. While in the standalone version it may reside on the same hardware as the thread manager; in the networked version the simulation manager may reside on the master node while thread managers may reside only on the slave nodes.

Model and simulation setup on the system may be accomplished through interaction between the simulation manager with an external application and/or user (214). When the parameterization of the model is substantially complete (216), the user may notify the simulation and thread manager that the model is ready and they may proceed to the initialization barrier. This may allow threads to enter the next stage (e.g., model initializations 218 and 302 in FIGS. 2 and 3A, respectively). At this stage a model and simulation description may be parsed by the simulation manager (220) on the master node and passed on to various threads on the slave nodes either through network connection if the system is in networked mode or directly if the system is in single node mode. On the slave node, the information is distributed as depicted in FIG. 3A.

Population names are used in disk I/O thread to create corresponding files for the result output (304). List of populations that have outputs is used in communication thread to establish input and output queues on the slave node to communicate between connected populations (306). Equations and relating to the data are communicated to computational threads to instantiate the corresponding data structures (308). On the slave nodes, components of the model may be assigned to different computational threads depending on the hardware configuration of a particular slave.

After instantiation of the components, the communication queues between these components may be defined (224) as illustrated in FIG. 3A (310). In some implementations, this information is passed to computational threads (e.g., model components) and/or to communication threads (e.g., connectivity pattern between components), where the respective data structures are created and initialized 226. After the initialization, the initial values of output variables might be passed to disk I/O thread for output as illustrated in FIG. 3A (312). Next, disk I/O thread, communication thread, and computational threads may then enter the main simulation loop of the system, so they signal their readiness to the simulation manager and wait on the Post barrier for the Run signal from the simulation manager.

The main simulation loop of the system may be controlled by an external application on the master node through a set of API commands that it can pass to the simulation manager. The commands may include:

Quit, which may cause the simulation manager to exit the main loop and inform the slave thread managers locally (standalone version) or through network communication (networked version). The thread managers may inform other threads that the engine is exiting, wait for them to clean up and exit, and then exit the engine.

Reset, which causes the reset of the components and connections in the model to their initial states. In some implementations, there are several versions of Reset depending on whether the user wants to reinitialize activations (current values) of components, connectivity strengths, or both.

Re-create, which may cause the engine to return to the model and simulation setup stage and re-parse all the data structures. This command may also redistribute the components of the model to different nodes and/or computing hardware.

Run, which enters the computational loop. This command may have a parameter that defines whether a user wants a single step though computation, a defined number of steps, or a continuous calculation.

Stop, which may interrupt the currently executing computational loop after finishing the current cycle.

In some embodiments, iterations through a computational loop may include two phases or semi-cycles. During the Compute Semicycle, the model components may read their inputs from read-only output memory locations of other components, compute their own new values (228) and write them into their own write-only memory locations. During a Post Semicycle 230, the values from write-only locations in the component may be moved to its read-only locations to be available for others on the next Compute Semicycle. In some implementations, to reduce memory copying, the pointers to read-only and write-only memory locations are interchanged and the actual data is not copied.

Figure 3B:
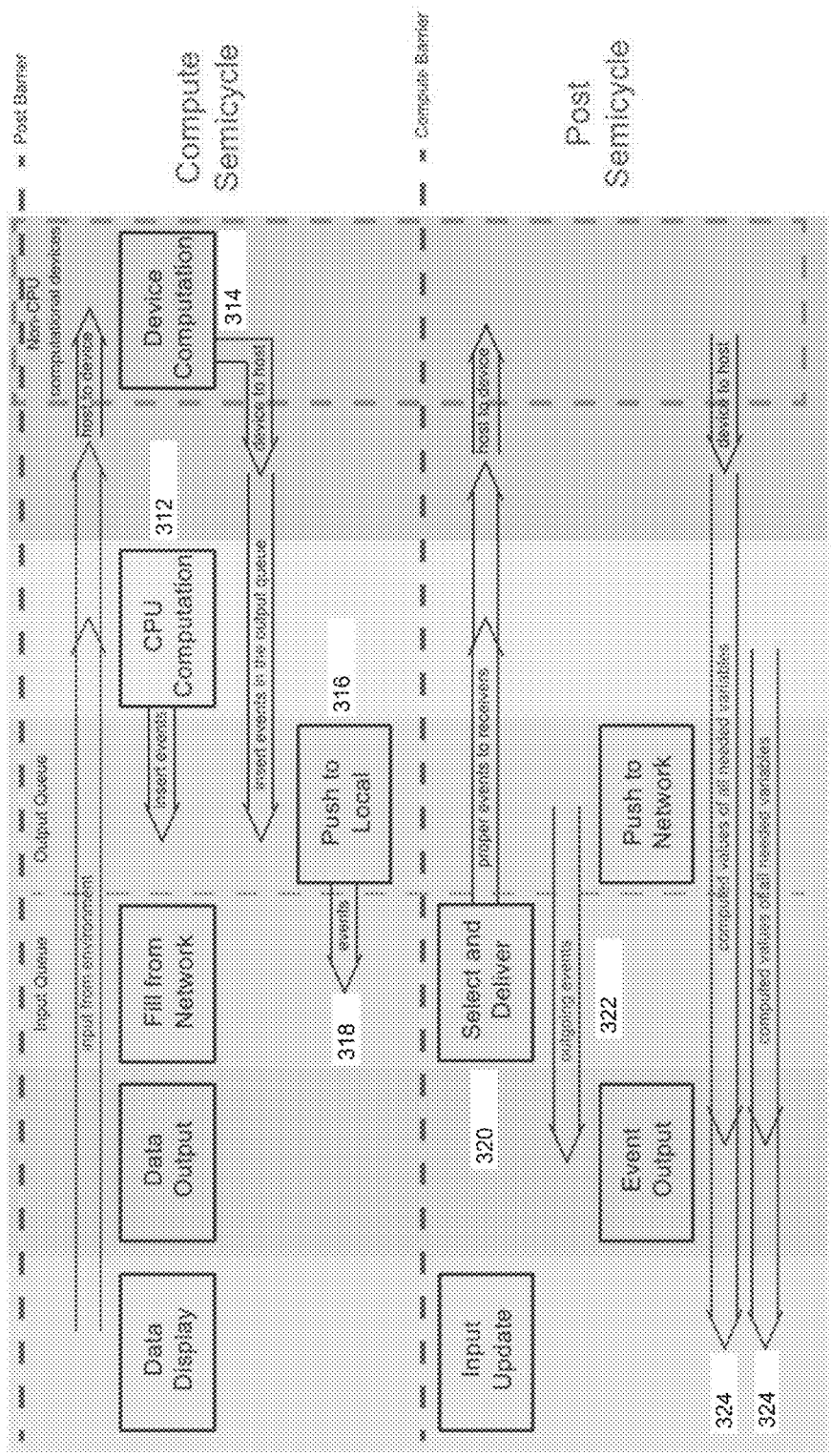

In some embodiments the communication between neuronal populations or systems of equations during the computational cycles may proceed as shown in FIG. 3B. During the Compute Semicycle output events produced in either CPU 312 or non-CPU 314 computational threads are pushed into queues (316) corresponding to these populations' outgoing event queues 232. At the same time a communication thread might receive events (318) from other nodes as well as from local output event queues and insert them into corresponding input event queues. During the Post Semicycle the communication thread delivers (320) the events from input queues to target populations and sends the output queues (322) to disk I/O thread for the output. At the same time the values of the variables can be communicated from the slaves to the master (324) for visualization.

Figure 3C:
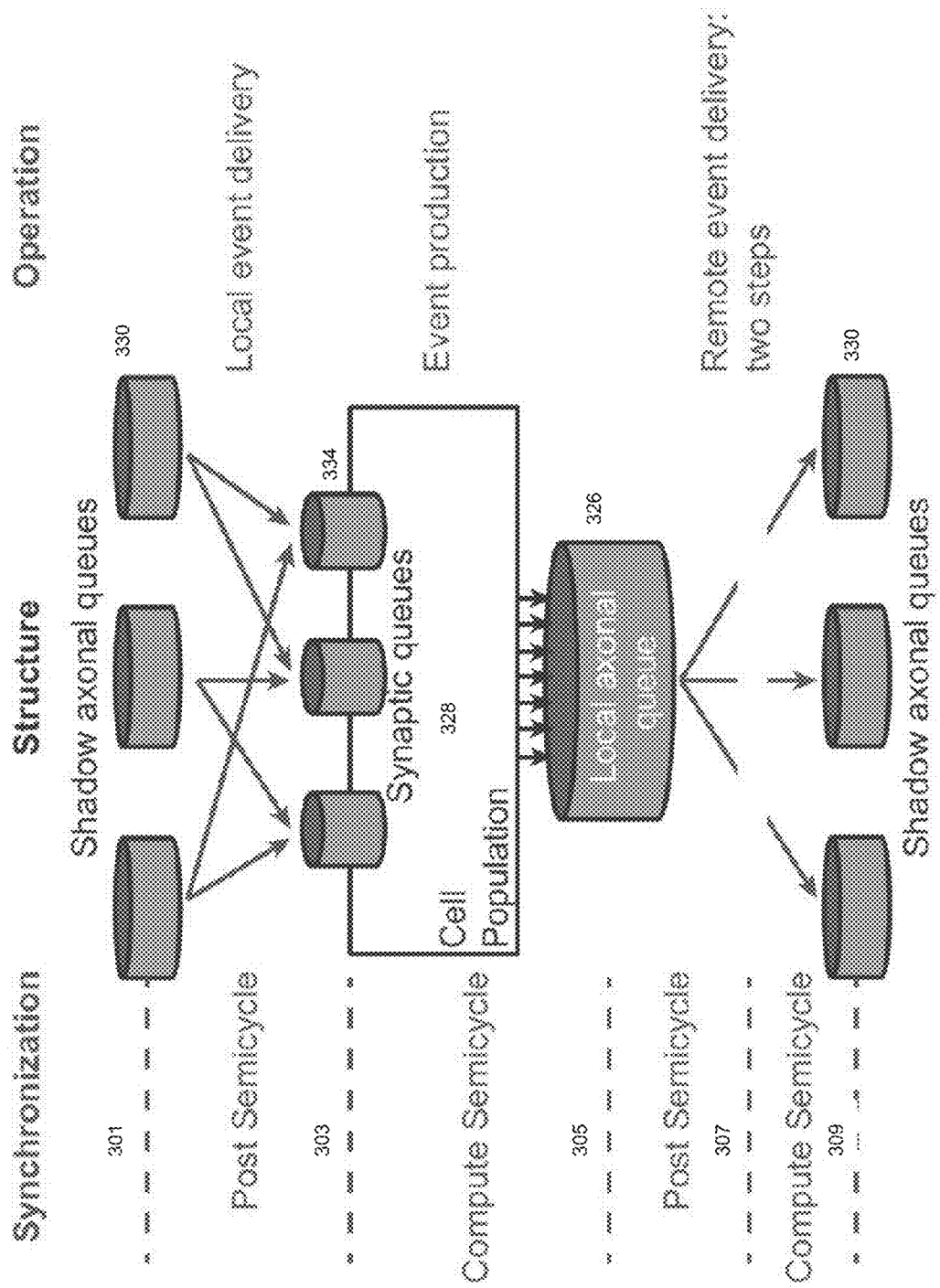
FIG. 3C is a flow chart of a method for event processing, according to one illustrative implementation.
Figure 3D:
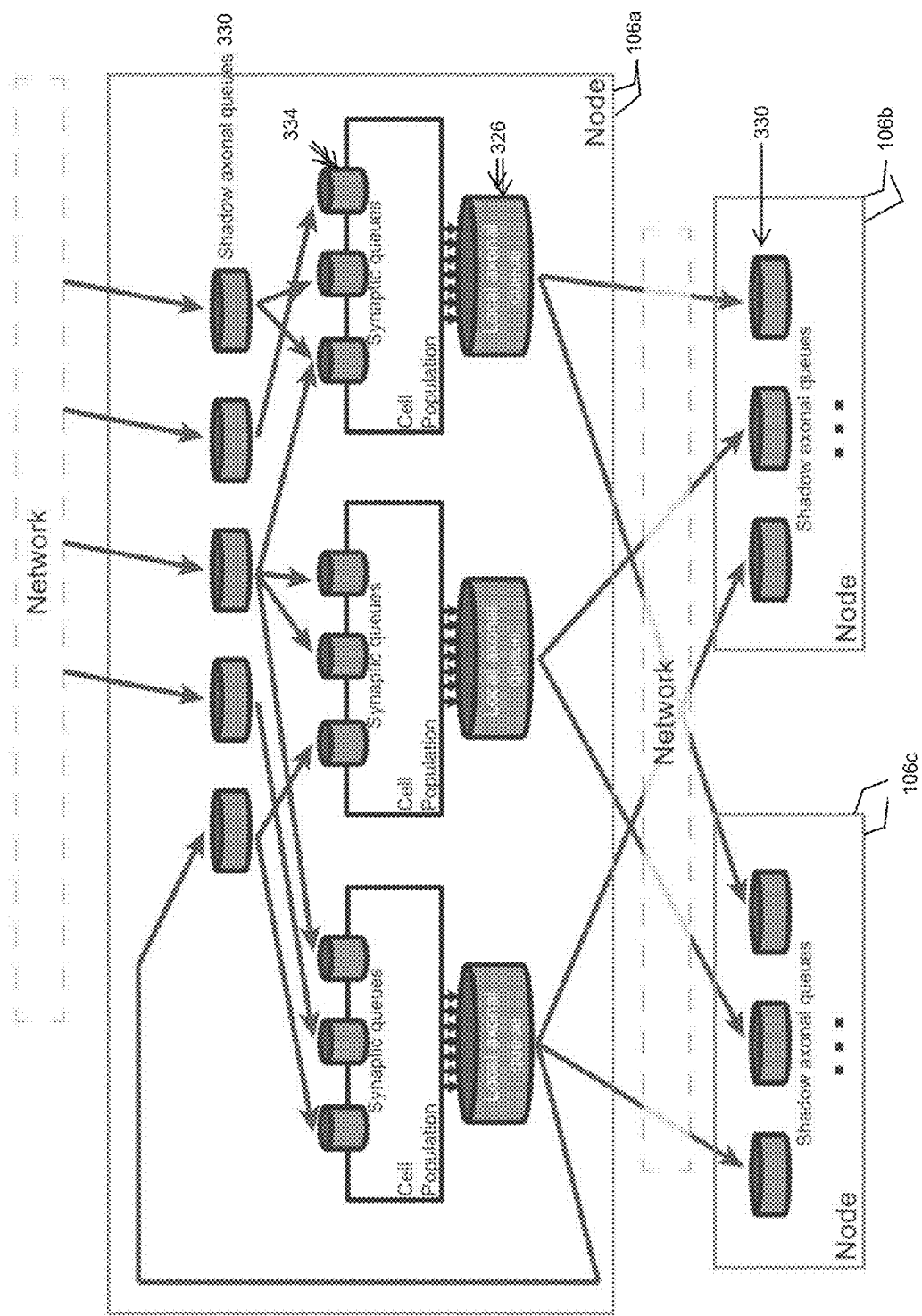
FIG. 3D is a flow chart of event communications between hardware nodes on the network, according to one illustrative implementation.

FIG. 3C provides a further elaboration on an example embodiment of the system in terms of event queues engaged by a single population on a single slave node, while FIG. 3D shows the same communication scheme from the network standpoint for a slave node with multiple populations. Each neuronal population or system of equations has one outgoing queue termed a local axonal queue 326, where the events produced by this population 328 are inserted during a first Compute Semicycle 303 after synchronization 301. In some implementations, local (outgoing) axonal queues can be implemented with a standard template library class called multimap that holds key-value pairs. For this queue the key may be event production time and the value can include, for example, receiver address and output value. STL multimap may facilitate automatic sorting by key, so this queue may have all output events sorted by their production time. For each receiver of events produced by this population, there is also a shadow axonal queue 330 located on the node where the receiver resides, which may be implemented in a manner similar to local axonal queues. To save memory, there may be only one shadow axonal queue per sender per node, from which all receivers may receive their respective input events coming from this particular sender. During the first Post Semicycle 303, the events are sent from the local axonal queues 326 to shadow axonal queues 330. During a first Compute Semicycles 305 following the first Post Semicycle 303, the events are collected by each node's shadow axonal queue 332. During the next Post Semicycle 307, the events are delivered from shadow axonal queues to corresponding receivers through input (synaptic) queues 334, which may be implemented in a manner similar to local axonal queues, but which may not require a receiver address, may represent timing via delivery time rather than production time, and may adjust the value according to the parameters of the synapse. As a result of this scheme, each output event can be delivered to the shadow axonal queues 330 as early as two cycles from its production (i.e., at the end of a second Compute Semicycle 309). The length of each semicycle in real time is determined by the computational load on the system, network load and latency, and may be bound from below by the slowest component. For simple models without much computational load using a standalone system, the semicycle length can be as short as 10 microseconds per a pair of Compute and Post Semicycles.

In the case of dynamical systems, however, especially those simulating neural populations, there can be axonal delay, and events are often delivered on the millisecond time scale, while the time steps of numerical integration of these equations are significantly shorter for reasons of numerical stability. Thus event delivery often may happen many more than two cycles from their production. The example system presented herein takes advantage of that by bundling the events between nodes in packages and sending these packages over the network only when the first event in the package is due for the delivery. Bundling and sending packages reduces network communication overhead.

The CPU based computational threads may be organized differently from non-CPU based threads. A component of the model that represents a massive data-parallel population may be passed as a whole to non-CPU thread and to the hardware device it controls to reduce cross-device communication. In some embodiments, the CPU thread population may be split into as many parts as there are CPU threads to balance the CPU load. Thus, initialization and posting for CPU populations may happen as a whole population across threads operation, while computation is done in parts by respective CPUs.

In some implementations some slave nodes can reside in a cloud environment and other slave nodes can reside on individual robots, while a master node can reside on a user device, such as a tablet device, smartphone, laptop, or desktop computer. This may enable running large-scale robotic artificial brains, where part of the computation occurs on the processors on board of the robot (e.g., a CPU and a GPU on a Single Board Computer (SBC); another example can be a portable handheld device installed onboard and controlling the robot with their respective CPU and GPU), and part of the computation occurs on a server connected via a tethered or wireless link. In some implementations the on-board computation device may be referred to as a "Local brain" and the remote computation device may be referred to as a "Cloud brain" (e.g., see FIG.

4), but in both cases these may be hosting slave nodes, while the master node may allow the user to control the system remotely.

Figure 4:
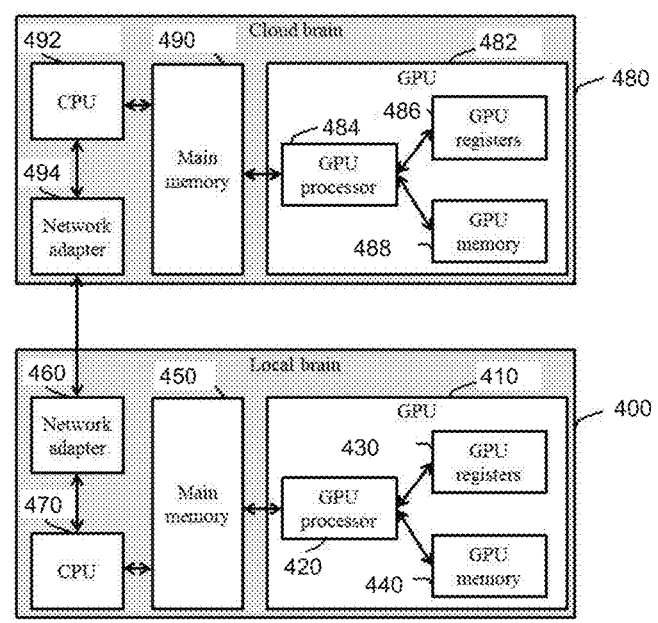
FIG. 4 is a diagram of an illustrative implementation of a cloud server (brain) and a local robot, according to one illustrative implementation.

Referring to FIG. 4, the Local brain 400 includes (but is not limited to) a GPU 410, which includes in turn a GPU processor 420 and associated GPU registers 430 and GPU memory 440, a Main Memory 450, a CPU 470, and a Network adapter 460.

The Cloud brain 480 includes (but is not limited to) one or more interconnected computers whether encased separately or within a cluster rack, each of which may include a GPU 482, which includes in turn a GPU processor 484 and associated GPU registers 486 and GPU memory 488, a Main Memory 490, a CPU 492, and a Network adapter 494.

In general, the Cloud brain 480 has a larger computational capacity with respect to the Local brain 400. Communication between the Local brain 400 and the Cloud brain 480 is established through the network using existing protocols which include but are not limited to Wi-Fi, Bluetooth, and others, and allows for intermediary routers that will convert wired communication with the Cloud brain 480 into wireless communication with the mobile robot. On top of these communication protocols there may be a communication layer that allows information passing between slave nodes described above.

Neural models can be distributed between slaves in the Local brain 400 and the Cloud brain 480 based on several considerations, for instance, to process some of the neural stages on board in order to reduce network communication load, or minimize the reaction time of the robot (e.g., computing optic flow for collision avoidance).

Figure 5:
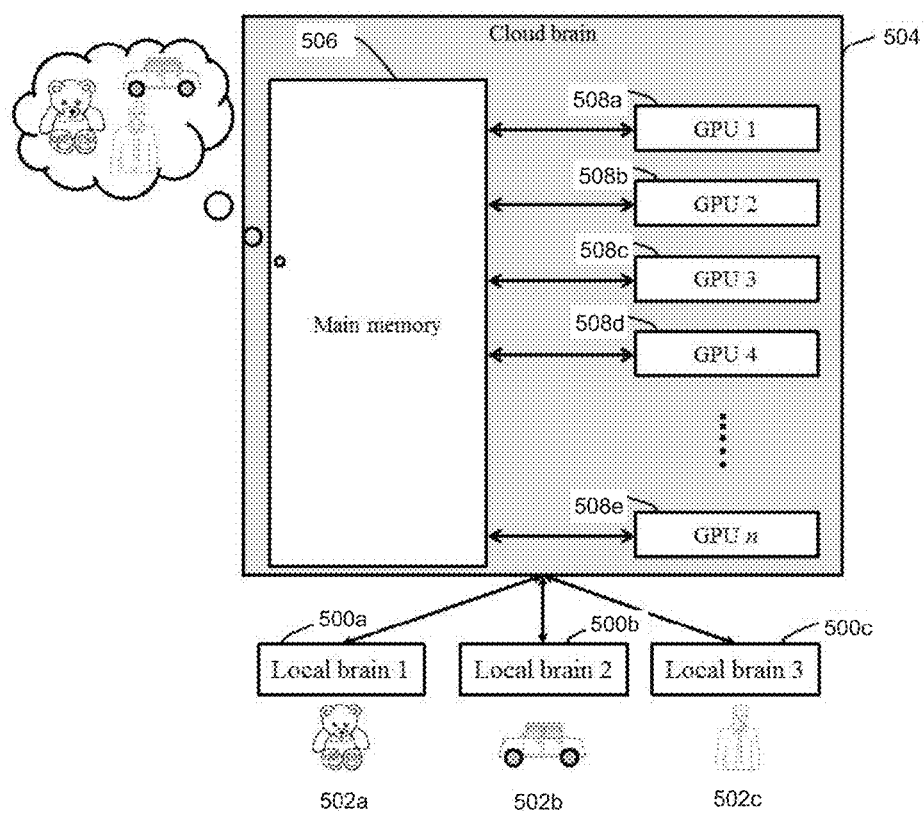
FIG. 5 is a diagram of an illustrative implementation of a cloud server (brain) and a plurality of local robots, according to one illustrative implementation.

A cloud brain 480 may connect to one or more robots. FIG. 5 illustrates the case of one slave node, but the method illustrated below can be generalized to an arbitrary number of slave nodes.

FIG. 5 illustrates an example of how Local brains can update the knowledge of the Cloud brain, and how the resulting collective knowledge can be then used by each individual Local brain. The examples below pertain visual input, but the same principle can be applied to all sensory modalities and in general to any neural network stage present in the Robot brain.

In FIG. 5, Local brains 1 (500a), 2 (500b), and 3 (500c) are running on Robot 1, 2, and 3, respectively, in order to learn the identity of three different objects. Robot 1 (502a), 2 (502b) and 3 (502c) can belong to the same user, or to respective users. Since, in some implementations, the robots may be sharing knowledge, the robots' users may, a priori, agree to share it. Such implementations may be useful to users within a company where all robots share company-specific knowledge, as a non-limiting example. In this example, the Cloud brain 504, which can reside in one or multiple slave nodes, has a Main Memory 506 connected to a plurality of CPU or non-CPU devices 508a-e, and the resulting brain jointly learns the identity of the objects encountered by each robot. Given each Robot is controlled by the Cloud Brain, the knowledge gained via one Robot input is available to all Robot connected to the same Cloud brain.

Figure 6:
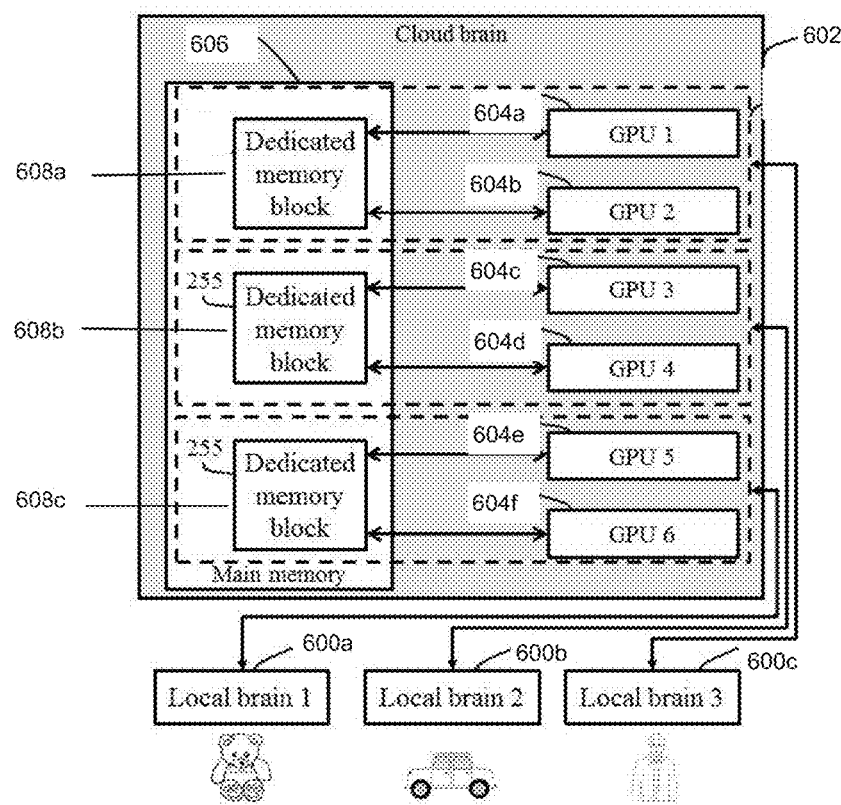
FIG. 6 is a diagram of an illustrative implementation of a cloud server (brain) with separation of processors and memory dedicated to a plurality of robots, according to one illustrative implementation.

FIG. 6 illustrates an example of an aggregate Cloud brain 602, where there exists a physical separation of the processors 610 and the memory 606, which includes memory blocks 608a-608c (collectively, dedicated memory blocks 608) and processors 604a-604f (collectively, processors 604) that form respective cloud brains 610a-610c (collectively, cloud brains 610) dedicated to each Robot 600a-600c. This version can used by users who do not wish to share the robotic knowledge on a constant basis. In some implementations sharing may still be possible through specific requests, e.g., if all of the users involved in the exchange of information agree to share. In this example, each Robot 600 may have a separate set of processors 604a-604f and associated memory blocks 608a-608c available that may not overlap with other Robots.

Figure 7:
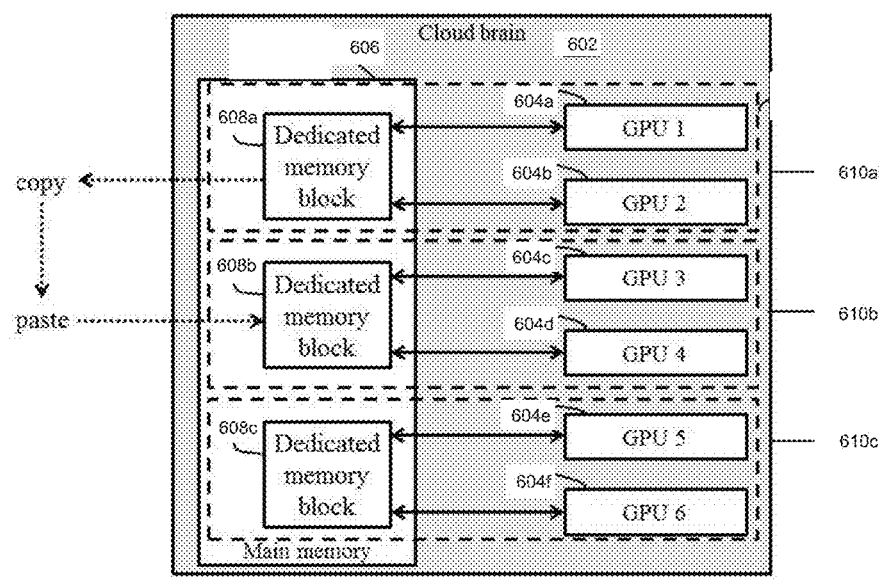
FIG. 7 is a diagram of an illustrative implementation of transferring knowledge to a first robot from a portion of a cloud server (brain) dedicated to a second robot, according to one illustrative implementation.

FIG. 7 illustrates an example of how the knowledge derived from the portion of the Cloud brain 602 dedicated to a robot 600 can be transferred to another robot by copying and pasting 708 the model architecture and the associated weight matrices processed by the corresponding processors 604 and stored in the respective dedicated memory block 608 or the Main memory 606.

Figure 8:
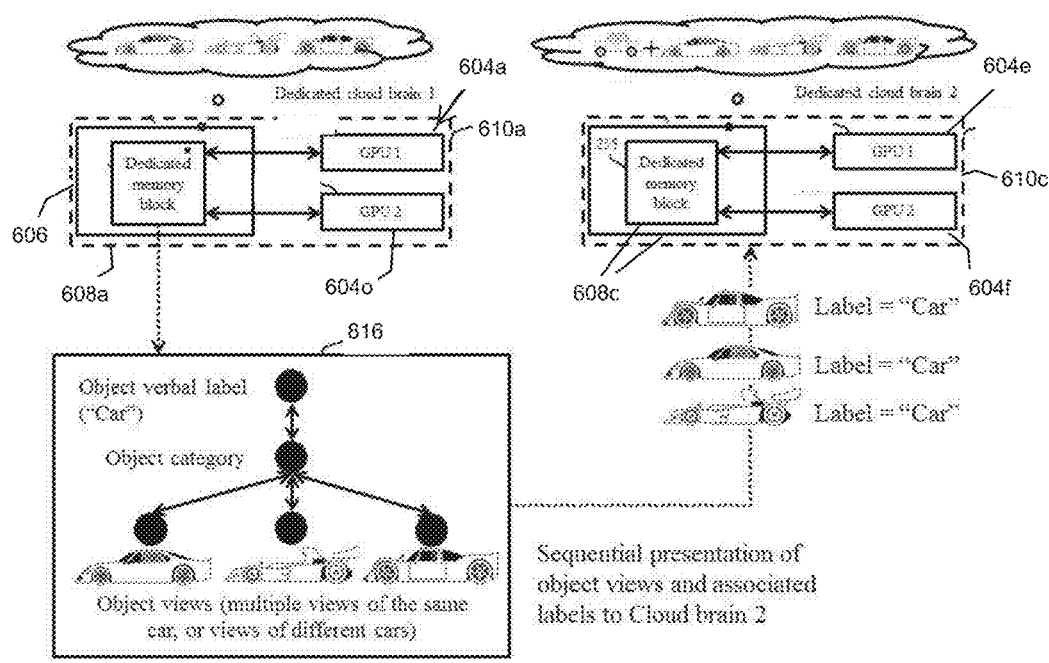
FIG. 8 is a diagram of an illustrative implementation of sharing knowledge on a cloud server (brain) without copying network structure.

FIG. 8 illustrates an example of how dedicated Cloud brains can share knowledge without copying or pasting network structure or weights. In the example, a dedicated Cloud brain 610a has been exposed to the visual presentation of three cars, coded by the network represented in 816, which includes neurons coding for different views of the cars (e.g., Object views 818), of the collective object "Car" (e.g., Object category 820), and the representation of an associated verbal label to this object (e.g., "Car" 822). These neural representations stored in Main memory 606 of the dedicated Cloud brain 610a and processed by processors 604a and 604b can be reactivated, for instance in a "sleep" cycle (or off-cycle, namely when the Robot is not active), in the following way:

A "Car" label is activated in the Cloud brain 610a;
This leads to the activation of 1 or more Object categories in Cloud brain 610a associated with that name;
Each Object category has 1 or more Object views, represented the neural representation of an object associated with that object view, e.g. multiple views of a car (in the figure, only one view of each car class is represented);
Each Object view and its associated label are then presented to the Cloud brain 610c;
In the Cloud brain 610c, previous knowledge was already present in 814 (in the example, the "Car" category already included one example);
As a result of this learning, the Cloud brain 610c now has knowledge of all objects learned from Cloud brain 610a plus its own knowledge (814), and can further process the information via processors 610e and 610f.

The same process can be applied for different data samples of the same object or environment, e.g., when different Robots have collected several views of the same object from different angles, or when several robots have explored the same environment with different paths.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of processing sensory data in parallel, comprising:
   (A) receiving, at a master node, a request to process incoming sensor data;
   (B) receiving, from the master node, a selection of a set of slave nodes, the set of slave nodes selected from a set of nodes capable of processing the incoming sensor data;
   (C) establishing a connection between the master node and the set of slave nodes; and, for at least one slave node in the set of slave nodes:
   (D) determining a dynamic system model for a portion of the incoming sensor data received by the at least one slave node, the dynamic system model including a neural model, wherein neuronal dynamics of the neural model are represented by a set of equations;
   (E) distributing, from the master node to the at least one slave node, a representation of the dynamic system model and a representation of corresponding graph connections between slave nodes in the set of slave nodes;
   (F) instantiating at least one local data structure for processing the incoming sensor data based at least in part upon the representation of the dynamic system model distributed in (E);
   (G) connecting the at least one slave node to other slave nodes in the set of slave nodes according to the representation of the graph connections distributed in (E);
   (H) receiving a signal from the master node to process the incoming sensor data; and
   (I) iteratively processing the incoming sensor data using the at least one local data structure instantiated in (F).

2. The method of claim 1, wherein (B) further comprises selecting the set of slave nodes automatically.

3. The method of claim 1, wherein (B) further comprises selecting the set of slave nodes according to user input.

4. The method of claim 1, wherein (E) further comprises:
   assigning the set of equations corresponding to the dynamical system model to the at least one slave node based on at least one of: computational power of the at least one slave node, computational complexity of the set of equations, and communication between parts of a dynamical system represented by the dynamical system model.

5. The method of claim 1, further comprising:
   (J) storing results of the iterative processing in a data queue in the at least one slave node for communication with the other slave nodes in the set of slave nodes.

6. The method of claim 1, further comprising:
   (K) storing results of the iterative processing in a storage medium for off-line analysis.

7. The method of claim 4, wherein (E) further comprises:
   assigning, by the at least one slave node, a set of computational threads for processing at least a portion of the incoming sensor data.

8. The method of claim 1, wherein (G) further comprises:
   (G1) determining an operating mode of the master node; and
   (G2) connecting the master node to the at least one slave node based on the operating mode of the master node.

9. The method of claim 8, wherein (C) comprises:
   connecting the master node to the at least one slave node via a network connection if the master node is configured to operate in a networked mode; and
   compiling the slave node into the master node if the master node is configured to operate in a standalone mode.

10. The method of claim 8, wherein the master node is configured to operate in a networked mode or a standalone mode based on available resources.

11. The method of claim 10, wherein the master node is configured to operate in the networked mode if (i) the master node is able to connect to a network and (ii) there is at least one slave node connected to the network.

12. A system for processing sensory data in parallel, the system comprising:

a master node; and at least one slave node, wherein the master node is configured to:
- (A) receive a request to process incoming sensor data;
- (B) transmit a selection of a set of slave nodes, the set of slave nodes selected from a set of nodes capable of processing the incoming sensor data;
- (C) establish a connection to the set of slave nodes, and, for the at least one slave node in the set of slave nodes:
  - (D) determine a dynamic system model for a portion of the incoming sensor data received by the at least one slave node, the dynamic system model including a neural model, wherein neuronal dynamics of the neural model are represented by a set of equations;
  - (E) distribute a representation of the dynamic system model and a representation of corresponding graph connections between slave nodes in the set of slave nodes;

wherein the at least one slave node is configured to:
- (F) instantiate at least one local data structure for processing the incoming sensor data based at least in part upon the representation of the dynamic system model distributed in (E), and
- (G) connect to other slave nodes in the set of slave nodes according to the representation of the graph connections distributed in (E);
- (H) receive a signal from the master node to process the incoming sensor data; and
- (I) iteratively process the incoming sensor data using the at least one local data structure instantiated in (F).

13. The system of claim 12, wherein the master node is further configured to determine the selected set of slave nodes in response to a user input.

14. The system of claim 12, wherein the master node is further configured to automatically transmit the selected set of slave nodes.

15. The system of claim 12, wherein the master node is further configured to assign the set of equations corresponding to the neural model to the at least one slave node in (E).

16. The system of claim 12, wherein the at least one slave node is configured to determine an operating mode of the master node and to connect to the master node based on the operating mode.

17. The system of claim 12, wherein the at least one slave node is configured to store results of the iterative processing in a data queue for communication with the other slave nodes in the set of slave nodes.

18. The system of claim 12, wherein the master node is further configured to:
synchronize processing the incoming sensor data across the slave nodes in the set of slave nodes.

19. The system of claim 12, wherein each slave node in the set of slave nodes includes at least one threading structure to control output of that slave node.

20. The system of claim 15, wherein the master node is configured to assign the set of equations based on at least one of: computational power of the at least one slave node, computational complexity of the set of equations, or communication between parts of a dynamical system represented by the neural model.

21. The system of claim 20, wherein the at least one slave node assigns a set of computational threads for processing at least a portion of the incoming sensor data.

22. The system of claim 16, wherein the master node is configured to connect to the at least one slave node via a network connection if the operating mode of the master node is a networked mode.

23. The system of claim 16, wherein the master node is configured to compile the slave node into the master node if the operating mode of the master node is a standalone mode.

24. The system of claim 16, wherein the master node is configured to operate in a networked mode or a standalone mode based on available resources.

25. The system of claim 24, wherein the master node is configured to operate in the networked mode if (i) the master node is able to connect to a network and (ii) there is at least one slave node connected to the network.

26. The system of claim 12, wherein the master node distributes the representation of the dynamic system model among the slave nodes by distributing a plurality of neuronal populations and corresponding synapses.

27. The system of claim 26, wherein each neuronal population in the plurality of neuronal populations comprises a collection of identical systems of equations.

28. The system of claim 26, wherein each neuronal population in the plurality of neuronal populations comprises at least one neuronal element.

29. The system of claim 28, wherein the at least one neuronal element includes a plurality of output variables.

30. The system of claim 29, wherein an output variable in the plurality of output variables is an output of the at least one neuronal element.

31. The system of claim 29, wherein an output variable in the plurality of output variables affect at least one other neuronal element in the neural model.

32. The system of claim 19, wherein the at least one threading structure includes a communication thread to control output events between neuronal populations in the neural model.

* * * * *